May 31, 1960     H. LEVINE     2,938,990

ELECTRIC COOKING VESSEL

Filed April 1, 1958

Inventor:
Harvey Levine,
by Leonard J. Platt
His Attorney.

2,938,990

ELECTRIC COOKING VESSEL

Harvey Levine, Fairfield, Conn., assignor to General Electric Company, a corporation of New York Filed Apr. 1, 1958, Ser. No. 725,527

1 Claim. (Cl. 219—44)

This invention relates to an electrically heated cooking vessel, and more particularly, to a substantially watertight cover arrangement for the electric heating element thereof.

Electrically heated cooking vessels provide a valuable addition to the culinary art; but the extent of their use depends to a great degree on the ease with which they may be cleaned to present a pleasing appearance. In the case of most cooking vessels including sauce pans and skillets, this usually involves immersion of the vessel in water. In order to permit at least partial immersion of an electric cooking vessel, it has been customary to cast-in a sheathed electrical heating element integral with the bottom wall of the vessel. Such an arrangement permits the vessel with the cast-in heating element to be immersed for cleaning but also presents a protuberance at the heating element and a relatively rough aluminum bottom surface, thereby creating cleaning problems. Further, the bottom surface of the vessel including the downwardly extending protuberance formed by the heating element becomes very hot during cooking, thereby permitting dirt and grease to be burnt and fused to the bottom surface of the vessel, and thus rendering the cleaning job even more difficult.

Accordingly, it is a primary object of this invention to provide a new and improved electrically heated cooking vessel which may be fully immersed in water for cleaning, and which may be easily and completely cleaned to present a pleasing appearance.

In accordance with one aspect of this invention, an electrically heated cooking vessel comprises a bottom wall and a side wall. A metal sheathed electric heating element is permanently fixed to the underside of the bottom wall of the vessel and a sheet metal cover having a smooth, easily cleanable outer surface is fixed to the underside of the bottom wall for enclosing the heating element. A safety aperture is formed in the cover and a resilient plug is provided for closing the aperture. By this arrangement, a substantially watertight enclosure is provided for the heating element to permit the vessel to be immersed in water and easily cleaned.

Figure 1:
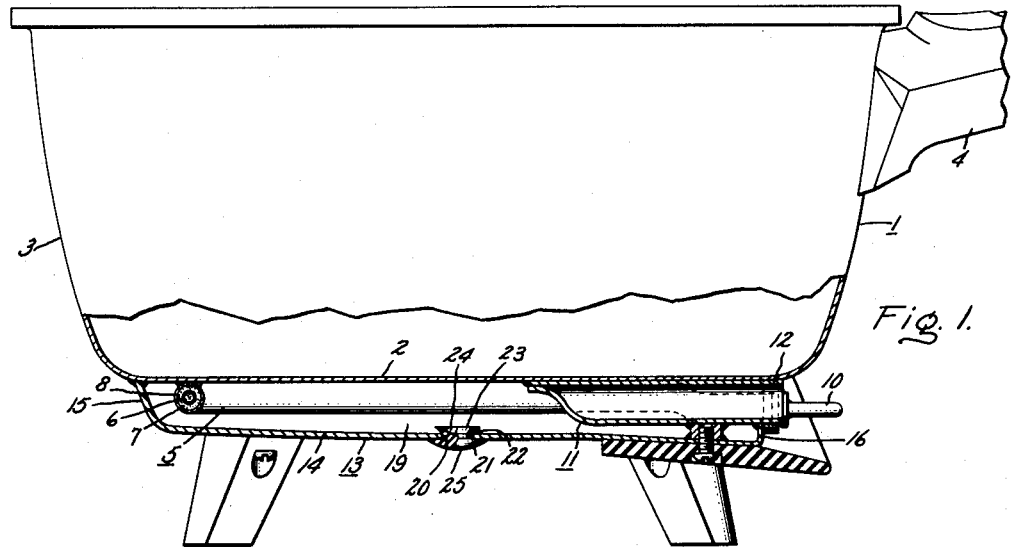
Figure 2:
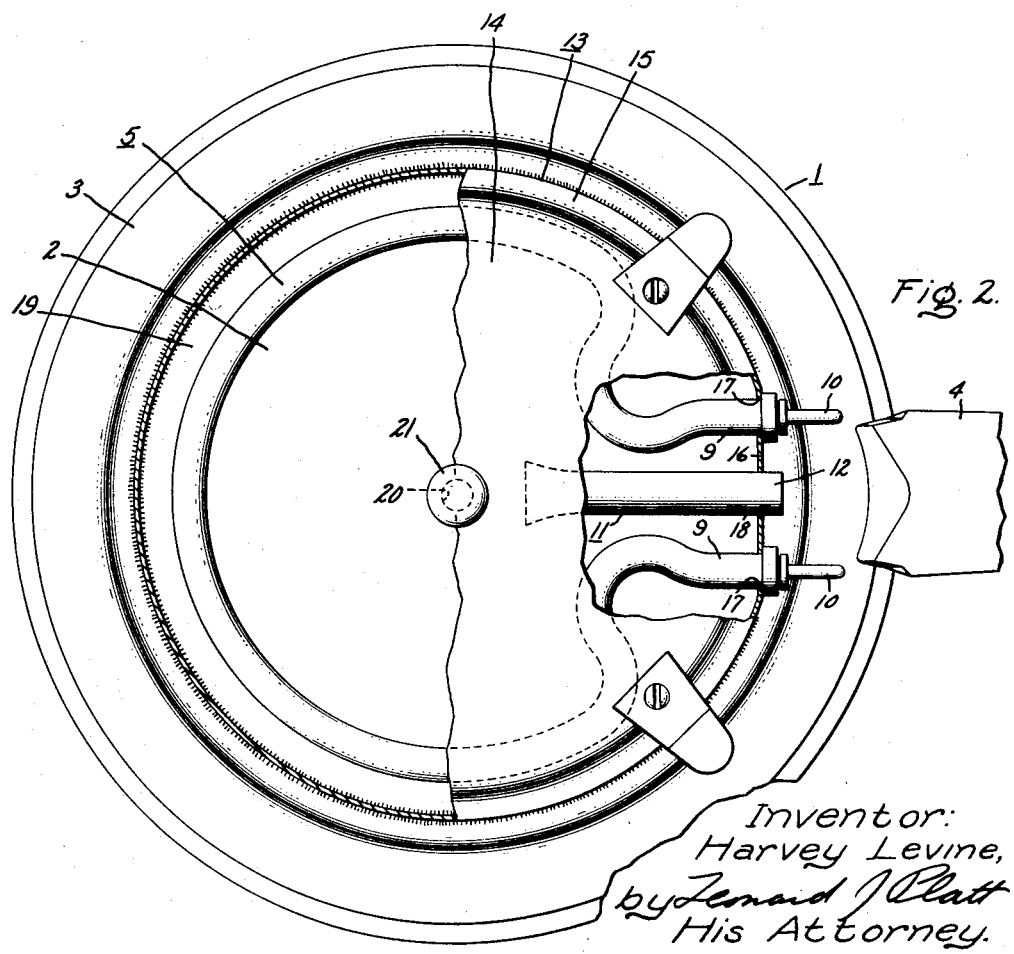

Other objects and attendant advantages of this invention will be apparent from the following description taken in connection with the accompanying drawing in which:

Fig. 1 is a side elevational view, partially in cross-section of an improved electric cooking vessel embodying the present invention; and Fig. 2 is a bottom view of the cooking vessel of Fig. 1 with a portion of the bottom cover broken away.

Referring to the drawing, this invention has been shown in one form as applied to an electric saucepan generally designated by reference numeral 1. The sauce pan 1 has a bottom wall 2 and an upright side wall 3 formed integrally therewith. The vessel may conventionally include a handle 4 and a top cover (not shown). An electric heating element 5 is provided for heating the bottom wall 2, and preferably, the sauce pan is formed from aluminum which has very good heat conduction properties, thus insuring substantially uniform temperature throughout the upper surface of bottom wall 2.

As shown more particularly in Fig. 1, the heating element 5 comprises a resistor 6 imbedded in a compacted mass of powdered heat refractory insulating material 7, the resistor 6 and insulation 7 being encased by a metallic sheath 8. The insulation may be of any suitable substance, but preferably will be formed of powdered magnesium oxide. This material may be compacted to a hard dense mass having a good heat conductivity in any suitable manner, such as by reducing the diameter of the sheath after the unit has been assembled and the sheath has been loaded with magnesium oxide. Although sheath 8 may be of any desired cross-sectional form, preferably it is circular.

As shown in Fig. 2, the sheated heating element 5 is bent into the form of a loop with the generally straight ends 9 thereof extending substantially parallel to each other. In order to insure intimate heat exchange relationship between the sheathed heating element 8 and the cooking surface on the upper side of the bottom wall of the cooking vessel, sheathed heating element 8 may be brazed to the underside of bottom wall 2. The short, generally straight ends 9 of the heating element may be spaced from the bottom wall 2 of the vessel to extend outwardly therefrom, for the purpose to be more fully described hereinafter.

Terminal pins 10 are connected to the ends of resistor 6, and in order to render the ends of the electric heating element absolutely impervious to the leakage of fluids into sheath 8 a unique seal is provided. The seal between terminal pins 10 and the ends 9 of sheath 8 forms no part of the present invention, it being disclosed and claimed in a co-pending application of Otto F. Gerry and myself, Serial No. 733,574, filed May 7, 1958, and assigned to the assignee of the instant application.

The sauce pan 1 further is provided with a cylindrical thermal conducting tube 11 for receiving a generally cylindrical temperature responsive probe (not shown) of an improved control for an electrically heated cooking vessel. The temperature responsive control including the generally cylindrical probe forms no part of the present invention, but constitutes the subject matter of my co-pending application Serial No. 715,544, filed February 17, 1958, and assigned to the assignee of the instant application. Since it is imperative that the temperature within thermal conducting tube 11 be as close to the temperature of the cooking surface as possible, it is preferably brazed to the underside of bottom wall 2 in good thermal conducting relationship therewith. As shown in Fig. 2, thermal conducting tube 11 is arranged generally parallel to the straight ends 9 of sheathed heating element 8, and the end 12 thereof extends radially outwardly from the center of the sauce pan to substantially the same extent as the ends 9 of tubular heating element 8.

According to the present invention, the aforementioned elements are combined with a uniquely designed cover 13, which is preferably formed from sheet aluminum which may be easily and completely cleaned to present a pleasing appearance. As shown in Fig. 1, cover 13 is dish-shape and includes a bottom wall 14 and a short side wall 15. The greater portion of side wall 15 is curved outwardly to merge in a graceful line with respect to bottom wall 2 of the cooking vessel to provide a smooth, unfettered surface which is substantially free of ridges, ledges, protrusions, depressions, or the like so that the cooking vessel may be easily cleaned; and a portion 16 of side wall 15 in the vicinity of the ends 9 of the heating element 5 is stamped to provide a generally vertical wall portion 16 for cooperation with the ends 9 of tubular heating element 5 and the end 12 of thermal conducting tube 11. As shown in Fig. 2, vertical wall portion 16 is provided with a plurality of openings 17 and 18 for receiving the ends of heating element 8 and the end 12 of heat conducting tube 10, respectively.

With this arrangement, cover 13 is placed so that it encloses and protects tubular heating element 8 with the ends 9 of the heating element and the end 12 of the thermal conducting tube 11 extending through the vertical wall portion 16 thereof. Cover 13 is preferably brazed to the underside of bottom wall 2 of the cooking vessel to provide a hermetically sealed enclosure 19 at the bottom of the cooking vessel.

According to the instant invention, in addition to the three holes for the ends 9 and 11 of the tubular heating element 5 and the conductive tube 11, respectively, a small aperture 20 is preferably centrally located in the bottom wall 14 of cover 13 to provide a plurality of functions. While cover 13 is being brazed to the bottom wall 2 of cooking vessel 3, aperture 20 permits the brazing gases to escape from enclosure 19. After brazing, aperture 20 receives a cleaning tube or jet for washing out the highly corrosive brazing fluxes and, of course, the wash fluids leave enclosure 19 through hole 20.

The last operation performed in the manufacture of the improved cooking utensil consists of pressing a resilient pressure plug 21 into hole 20 to maintain a hermetically sealed enclosure for the tubular heating element and heat conducting tube 11. In the event that water or other fluids become trapped within enclosure 19 any substantial pressure within the enclosure will blow plug 21 out of the hole 20.

Pressure plug 21 may be formed from a soft synthetic rubber and is provided with a central annular peripheral groove 22 for receiving the cylindrical side surface of aperture 20, an inverted generally frusto-conical portion 23 which may be centrally recessed at 24 to permit easy insertion within the aperture 20, and a curved outer surface 25 for smoothly blending with the bottom surface of cover 12. Should plug 20 be blown out of aperture 19, it may be replaced merely by inserting it in the aperture 20 until the outer surface 25 thereof meets with the surface of bottom cover 12.

It will be observed, therefore, that heating element 8 is hermetically sealed within enclosure 19, there being a brazed seal at the junction of side wall 15 of the cover 13 and the bottom wall 2 of cooking vessel 1, brazed joints between the ends of heating element 8 and cylindrical tube 11 and vertical wall portion 16 of the cover, and a resilient plug 21 for hole 20. Accordingly, cooking vessel 1 may be completely immersed for washing and may be easily and completely scoured since all of the outer surfaces of the vessel present smooth and graceful lines.

Further, it should be appreciated that the flat cleanable surface on the bottom of cover 13 is spaced some distance from heating element 8, thus maintaining this surface much cooler than the outer surface of metallic sheath 8, and therefore, it is aimed in the appended claims to cover and other substances from being fused or burned onto the bottom surface of cover 12.

While there has been shown and described a particular embodiment of this invention, it will be obvious to those skilled in the art that various changes and modifications can be made therein without departing from the invention, and therefore, it is aimed in the appended claim to cover all changes and modifications as fall within the true spirit and scope of the invention.

What I claim as new and desire to secure by Letters Patent of the United States is:

An electrically heated cooking vessel comprising: a metallic bottom wall and an upright side wall; an elongated metal sheathed electric heating element shaped to form a loop with the ends thereof extending generally parallel to each other; said heating element being brazed to the underside of said bottom wall; a generally cylindrical thermal conducting tube brazed to the underside of said bottom wall between the ends of said heating element and arranged generally parallel to said ends; a cover having a vertical side wall portion and a bottom wall, said cover being brazed to the underside of said vessel bottom wall radially outwardly from said heating element to enclose said heating element and said thermal conducting tube; said bottom wall of said cover being spaced from said heater element so as to provide an air space therebetween; spaced openings formed in said vertical side wall portion for receiving the ends of said heating element and the end of said thermal conducting tube, the ends of said heating element and said thermal conducting tube being brazed to said cover; an aperture formed in the bottom wall of said cover to permit brazing flux to be washed out of said enclosure after the brazing operation during manufacture of the vessel; and a resilient plug removably mounted in said aperture for normally providing a substantially water-tight closure for said aperture.

References Cited in the file of this patent

UNITED STATES PATENTS

| | | |
|---|---|---|
| 965,449 | Gale | July 26, 1910 |
| 2,236,238 | Lacy | Mar. 25, 1941 |
| 2,357,634 | Crites | Sept. 5, 1944 |
| 2,429,984 | Berglund | Nov. 4, 1947 |
| 2,838,650 | Lehr | June 10, 1958 |

FOREIGN PATENTS

| | | |
|---|---|---|
| 204,091 | Australia | Sept. 20, 1956 |

UNITED STATES PATENT OFFICE

CERTIFICATE OF CORRECTION

Patent No. 2,938,990            May 31, 1960

Harvey Levine

It is hereby certified that error appears in the printed specification of the above numbered patent requiring correction and that the said Letters Patent should read as corrected below.

Column 2, line 17, for "sheated" read -- sheathed --; column 4, line 5, strike out "therefore, it is aimed in the appended claims to cover" and insert instead -- thereby reducing the tendency for slop, grease, oil --.

Signed and sealed this 25th day of October 1960.

(SEAL)
Attest:

KARL H. AXLINE
Attesting Officer

ROBERT C. WATSON
Commissioner of Patents